United States Patent Office 3,395,491
Patented Aug. 6, 1968

3,395,491
DEVICE FOR RADIAL ADJUSTMENT OF A GRINDING HEAD OF A TOOL GRINDING MACHINE
Hermann Bürger, Huckeswagen, Rhineland, and Günter Zeise, Wuppertal-Ronsdorf, Germany, assignors to W. Ferd. Klingelnberg Söhne, Remscheid-Berghausen, Germany
Filed Mar. 31, 1965, Ser. No. 444,154
Claims priority, application Italy, Apr. 2, 1964, 7,099/64
9 Claims. (Cl. 51—34)

ABSTRACT OF THE DISCLOSURE

Grinding machine having a reciprocable grinding carriage and a grinding head on the carriage which can be advanced incrementally toward the work with an adjustable stop for stopping the advancing movement of the grinding head.

---

The present invention relates to a device for radially adjusting or feeding the grinding head of a tool grinding machine.

The sharp grinding of tools in which the grinding grooves do not run out freely but extend into the adjacent shank diameter will, with heretofore customary tool grinding machines, require that the work piece or grinding carriage of the machine be stopped following the finish grinding of a groove, and furthermore make it necessary that the grinding disc be moved out of the groove, the indexing operation to the next groove be initiated by hand, and that the grinding disc again be introduced and the machine be started for the grinding of the next groove.

When the grinding off of heavy layers is required, as is the case where considerable wear has occurred or when grinding edges of the tool have broken off, considerable time was required for such grinding operations with heretofore known grinding machines. More specifically, with heretofore known grinding machines in which the grinding disc is at the very start of the grinding operation adjusted to the full depth of the groove and in which the tool with the surface to be machined is, following each stroke, advanced tangentially by a certain amount toward the grinding disc, such grinding operation requires considerable time inasmuch as the magnitude of the possible feed is limited by the developed heat. A considerably greater grinding output and thus shorter grinding times can be realized without local overheating of the cutting teeth, when at the very start of the grinding operation the workpiece adjusted for the full thickness of the chip is removed and when the grinding disc starting at the outer diameter of the tool is, after each stroke, advanced stepwise radially until the complete groove depth has been reached, in other words, if the grinding operation is effected in conformity with the so-called plunge-cut grinding method. The grinding disc then removes the material layer in form of narrow strips the width of which corresponds to the layer thickness to be removed.

It is, therefore, an object of the present invention to provide an arrangement which will overcome the above-mentioned drawbacks.

It is another object of this invention to provide an arrangement for radially feeding the grinding head of a tool-sharp grinding machine which will make it possible economically to grind off heavy layers, as may be necessary in cases of heavy wear or breakage of the grinding edges of the tool.

These and other objects and advantages of the invention will appear more clearly from the following specification in connection with the accompanying drawings, in which.

Figure 6:
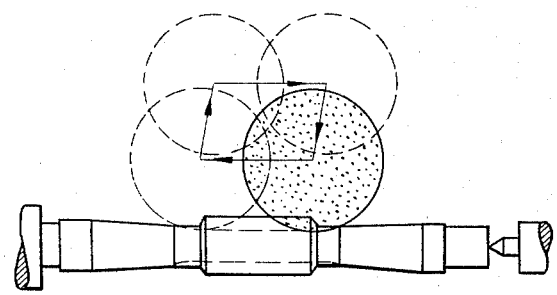

FIGURE 6 diagrammatically illustrates the one-way grinding as practiced with a machine according to the present invention.

The grinding machine according to the present invention is characterized primarily by a piston adapted to displace the grinding head radially with regard to the work piece. The said piston is reciprocable in a pressure or feeding cylinder which is journalled radially and axially in the grinding carriage and is connected to a tiltable grinding head carrier. Said pressure or feeding cylinder forms a pivot. The end positions of said feeding cylinder are determined by a nut forming an abutment and being adjustable on a spindle arranged in the interior of the piston and journalled in the cylinder cover.

This arrangement has the advantage that it is possible in any position of the grinding carriage during its longitudinal stroke to permit the radial outward and inward movement by feeding oil under pressure to the adjusting cylinder. This arrangement furthermore makes it possible, by a stepwise rotation of the sprindle carrying the abutment nut, to bring about a stepwise radial feeding of the grinding disc during the plunge-out grinding operation. The possibility of being able radially to move the grinding disc not only at any desired point of the grinding groove but also at the stroke ends of the grinding operation greatly facilitates the exchange of the work piece and increases the safety of operation.

Figure 1:
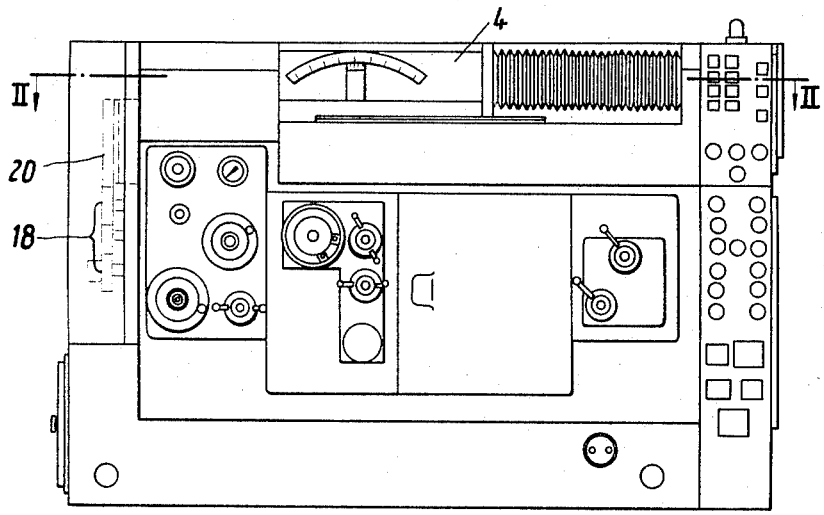
FIGURE 1 is a view of a tool-sharp grinding machine according to the present invention, which is provided with a device for radial advancement of the grinding-head according to this invention.
Figure 2:
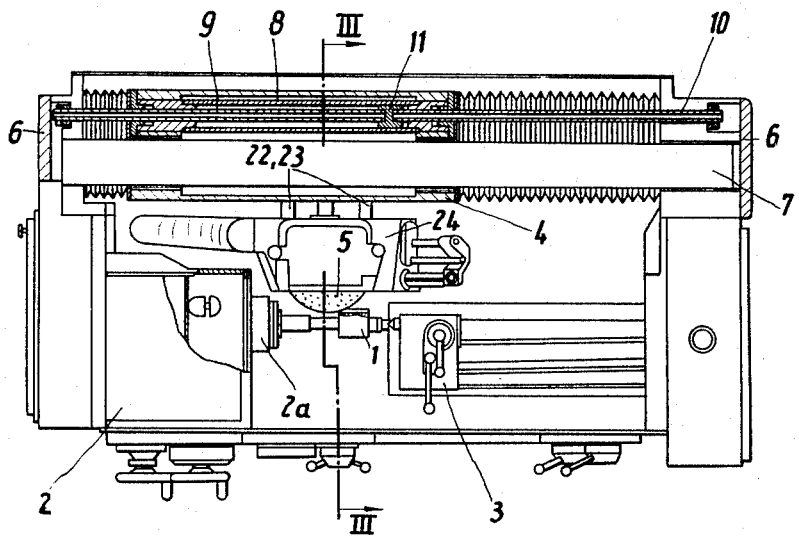
FIGURE 2 represents a top view and partial section of the machine according to FIG. 1, said section being taken along the line II—II of FIGURE 1.
Figure 3:
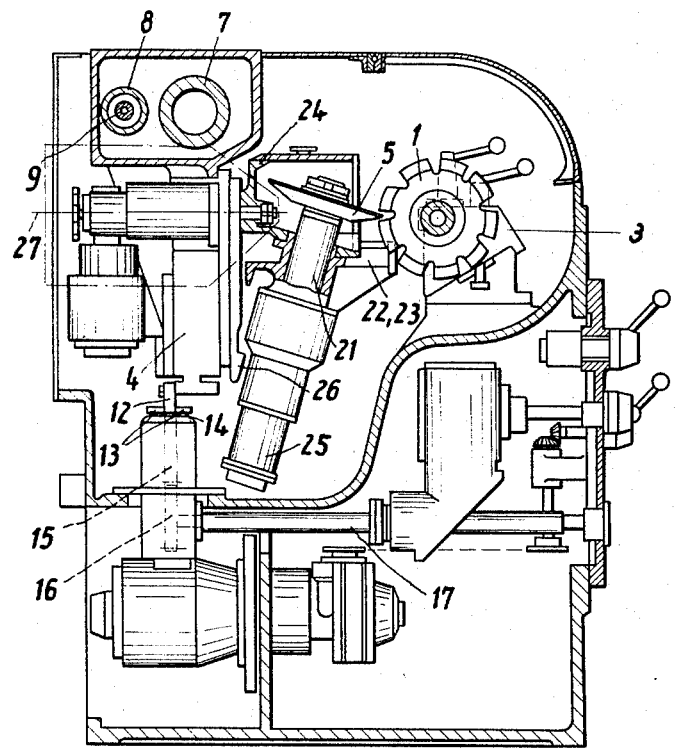
FIGURE 3 is a partial cross-section of a machine according to the invention as taken along the line III—III of FIGURE 2, the feeding cylinder for the grinding head being shown in view.

Referring now to the drawing in detail, and FIGS. 1 to 3 thereof in particular, the workpiece 1 to be ground is stationarily received by a workpiece spindle 2a on a spindle head 2 and is supported by a head stock 3. The workpiece will only automatically, in cooporation with the longitudinal stroke of a grinding carriage 4 with grinding disc 5, carry out a rotation about its axis of such a magnitude that the grinding disc will follow the helical line of the grooves of the tool to be ground. Grinding carriage 4 is guided in a suspended manner on a guiding cylinder 7 which extends above, and when viewing from the operator's side, behind the workpiece from the left-hand side wall to the right-hand side wall of machine bed 6. Carriage 4 is driven by a hydraulic stroke cylinder 8 arranged parallel to said cylinder 7. Cylinder 8 is slidable on a two-sectional piston rod the two sections 9 and 10 of which have their outer ends anchored in the side walls of the bed while those ends of the piston rod sections which face toward the center of the machine are fixedly connected to a piston 11. By alternately connecting the cylinder chambers on the right-hand side and left-hand side of piston 11 with the pressure and suction side of a hydraulic system of the machine, for instance in the manner described in assignee's copending application Ser. No. 444,191, filed of even date herewith and entitled "Tool Grinding Machine with Wet Grinding Device" (inventor Hermann Bürger), cylinder 8 and thus the grinding carriage connected thereto, will be reciprocated.

Grinding carriage 4 has a rail 12 connected to its bottom side which rail extends between two rollers 13 journalled on a bearing support screwed to the bed of the machine. By means of said rail 12, grinding carriage 4 is prevented from rotating about the axis of its grinding cylinder. The bottom side of rail 12 is provided with teeth 14 meshing with a gear 15. Gear 15 meshes with a gear 16 which is connected to a shaft 17 extending transversely through the machine bed. When grinding carriage 4 carries out a longitudinal stroke movement, shaft 17 is rotated by the said rack 12, 14 and the gears 15, 16. Shaft 17 through the intervention of a gear train which may be of the type disclosed in assignee's above-mentioned application (FIG. 11 thereof) and may comprise a reversing clutch and a play-compensating device, will drive change gears 18 on spindle head 2 (FIG. 1). The last one of said change gears 18 meshes with gear 20 on workpiece spindle 2a and thus will automatically with the longitudinal stroke of grinding carriage 4, drive itself in one and the other direction so as to turn back and forth. Change gears 18 adjust the transmission ratio which is required for the relative helical movement of the grinding disc in the groove to be machined of the tool to be ground, said transmission ratio depending on the pitch of said tool. The indexing control of the workpiece spindle from groove to groove is effected by an indexing control transmission with an indexing disc, hydraulically controlled pawls, and an oil motor, for instance likewise in the manner disclosed in assignee's above-mentioned copending application.

Grinding spindle 21 (FIG. 3) is journalled in a grinding head 24, which is adjustable on two guiding bars 22, 23 in a direction transverse to the axis of the machine. Said grinding spindle 21 is driven at an infinitely variable speed by means of an oil motor 25 at the lower end of said spindle 21. Guiding bars 22 and 23 are connected to a supporting body 26 which is adapted to be turned about an axis 27 which is perpendicular to the axis of the machine, for purposes of tilting the grinding disc in conformity with the pitch angle of the grooves to be ground. Supporting body 26 is adapted to be hydraulically arrested in its respective working position. The turning of the grinding disc is effected by a small motor 28 through a worm drive not illustrated in the drawing.

The radial advancement or adjustment of the grinding head 24 with grinding disc 5 in conformity with the depth of the grooves to be ground is effected by a piston 29 connected to said grinding head and adapted to displace itself in cylinder 30. Piston 29 is made up of piston head 29a slidably fitted into the bore in cylinder 30 and hollow rod 29b to which piston head 29a is fixed. Rod 29b is fixed to grinding head 24. Cylinder 30 is radially and axially journalled in grinding carriage 4 and is fixedly connected to the tiltable supporting body 26 of grinding head 24 for which cylinder 30 serves as pivot. Through bores 31 and 32, and corresponding conduits, the cylinder chambers in front and behind piston head 29a may be supplied with pressure fluid of the hydraulic system of the machine, in a manner similar to that disclosed in the above-identified copending application of assignee, so that piston 29 will move grinding head 24 either toward the workpiece or away therefrom.

Figure 4:
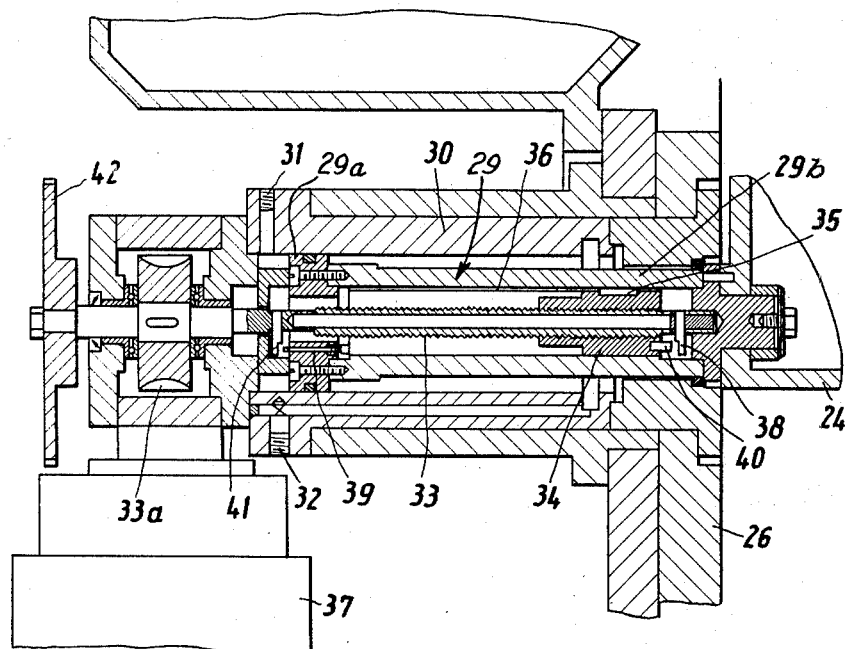
FIGURE 4 is a longitudinal section through the dot-dash line encircled portion of FIGURE 3 and shows the feeding cylinder for the grinding head.

Inside rod 29b, a nut 34 is threaded on a spindle 33 journalled in the lid or cover of cylinder 30 and non-axially moveable in cylinder 30. Said nut 34 is secured against rotation in rod 29b by a key 35 which is slidable in a groove 36 in the bore of rod 29b. For purposes of adjusting nut 34, spindle 33 is driven by a worm—worm wheel drive of which FIG. 4 shows wheel 33a only. The worm of the worm wheel drive, which is not shown in the drawing, is driven by a rotatable field magnet 37 adapted to be controlled by pushbuttons. In order to prevent nut 34 from engaging and jamming at its end faces on piston 29 when said nut 34 has reached its right-hand or left-hand end position, spindle 33 has inserted therein abutment elements 38, 41 which, prior to said nut 34 reaching its end positions, will radially engage abutments 39, 40 and halt rotation of the spindle. butment 40 is carried directly on nut 34, whereas abutment 39 is slidable in piston head 29a and is moved into abutting position by nut 34.

Figure 5:
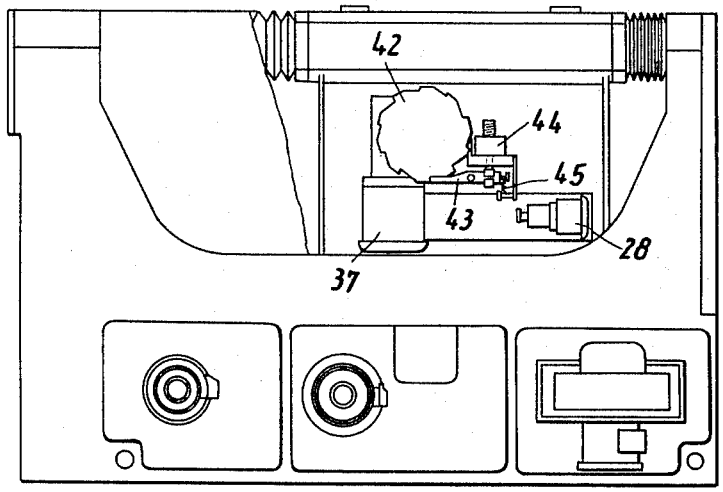
FIGURE 5 is a rear view of the machine with the cover partially broken away.

The left-hand end of spindle 33 carries an exchangeable ratchet wheel 42 which is adapted to be engaged by a control pawl 43 (FIG. 5). This pawl 43 may temporarily be lifted by a control magnet 44 and will subsequently, due to the thrust of a spring 45, immediately again engage the next notch of ratchet wheel 42. Control magnet 44 is controlled by limit switches, which are not shown, and are actuated by abutments of grinding carriage 4.

*Operation*

The feeding device according to the present invention operates in the following manner: The position of abutment nut 34 on spindle 33 determines the end position of piston 29 in cylinder 30 and thus the radial end positions of grinding head 24 with grinding disc 5. With a tool which is to be ground in customary manner, i.e. with the grinding disc moved in from the very start, in conformity with the depth of the total chip to be removed and with the tool fed towards the grinding disc in a tangential manner, abutment nut 34 is at the start of the working cycle so adjusted that grinding disc 5 will, with moved-in grinding head 24—cylinder chamber at the left of piston head 29a under pressure—occupy a position just in conformity with the total groove depth. This position is retained by the nut during the entire grinding operation.

After the grinding operation has been completed, oil under pressure is conveyed to the right-hand cylinder chamber so that the grinding head 24 is moved radially outwardly thereby permitting an exchange of the workpiece without any interference by grinding disc 5. Also at any other time and at any desired position of the grinding carriage, it will be possible to withdraw grinding carriage 4 and to move the same into working positions. If, for instance, it is necessary to sharp-grind a shank cutter the cutting grooves of which extend at one or both sides into the adjacent shank so that grinding disc 5 cannot be moved out laterally, it will be possible, by abutment control of grinding head 24, to move the latter outwardly in radial direction at that stroke end which is determined by the length of the possible grinding stroke. It is furthermore possible to carry out the return stroke and the indexing control while grinding disc 5 is in its withdrawn position, and at the end of the grinding stroke, grinding head 24 can again be moved inwardly. This is an operation which is known under the name of one-way grinding (FIG. 6).

If a rather worn tool is involved and it is necessary to grind off therefrom a rather large amount of material by a series of grinding operations, abutment nut 34 will at the start of the operation be so adjusted that grinding disc 5 will in its inwardly moved position just touch the workpiece from the outside. After mounting of a ratchet wheel 42 in conformity with the desired feeding rotation of spindle 33, rotatable field magnet 37 is continuously energized so as to bias spindle 33 in advancing direction so that control pawl 43, each time it is lifted off the ratchet wheel 42, advances by one notch until the desired depth of the groove in the tool has been obtained. The control pawl is lifted off the ratchet wheel after one grinding operation and prior to the next following grinding operation.

It is, of course, to be understood, that the present invention is, by no means, limited to the particular arrangement shown in the drawings, but also comprises any modifications within the scope of the appended claims.

What is claimed is:

1. In a grinding machine; a frame, a grinding carriage in the frame guided for reciprocation therein in a direction to convey a grinding wheel in the carriage along a workpiece being ground thereby, a cylinder carried by the carriage having its axis extending at an angle to said direction, a piston in the cylinder, a grinding head connected to said piston for being moved thereby, an abutment nut in the piston adapted abuttingly to engage and halt the piston in its movement in the cylinder, and means extending through an end wall of the cylinder and into the piston and engaging said nut for adjusting the nut axially in the piston and for holding the nut in its adjusted position.

2. In a grinding machine; a frame, a grinding carriage in the frame guided for reciprocation therein in a direction to convey a grinding wheel in the carriage along a workpiece being ground thereby, a cylinder carried by the carriage having its axis extending at an angle to said direction, a piston in the cylinder, a grinding head connected to said piston for being moved thereby, an abutment nut in the piston adapted abuttingly to engage and halt the piston in its movement in the cylinder, and means extending through an end wall of the cylinder and into the piston and engaging said nut for adjusting the nut axially in the piston and for holding the nut in its adjusted position, said cylinder being rotatable on its axis in said carriage, a grinding head carrier fixed to said cylinder, and means guiding said grinding head on said carrier.

3. In a grinding machine; a frame, a grinding carriage in the frame guided for reciprocation therein in a direction to convey a grinding wheel in the carriage along a workpiece being ground thereby, a cylinder carried by the carriage having its axis extending at an angle to said direction, a piston in the cylinder, a grinding head connected to said piston for being moved thereby, an abutment nut in the piston adapted abuttingly to engage and halt the piston in its movement in the cylinder, and means extending through an end wall of the cylinder and into the piston and engaging said nut for adjusting the nut axially in the piston and for holding the nut in its adjusted position, said cylinder being rotatable on its axis in said carriage, a grinding head carrier fixed to said cylinder, and means guiding said grinding head on said carrier, said means extending through an end wall of the cylinder comprising a threaded spindle rotatable but non-axially movable in said end wall and threadedly engaging said nut, and key means non-rotatably but axially movably connecting said nut to said piston.

4. A grinding machine according to claim 3, which includes a worm wheel on said spindle outside the cylinder, and power operable means for driving said worm wheel to rotate said spindle.

5. A grinding machine according to claim 4 in which said power operable means is electromagnetic.

6. A grinding machine according to claim 3, which includes a ratchet wheel on the spindle outside said cylinder, and pawl means on the machine frame biased toward engagement with said ratchet wheel.

7. A grinding machine according to claim 3, which includes a ratchet wheel on the spindle outside said cylinder, pawl means on the machine frame biased toward engagement with said ratchet wheel, and electromagnetic means operable for withdrawing said pawl from said ratchet wheel.

8. A grinding machine according to claim 3, which includes a worm wheel on said spindle outside the cylinder, power operable means for biasing said worm wheel to rotate said spindle, a ratchet wheel on the spindle outside said cylinder, and pawl means on the machine frame biased toward engagement with said ratchet wheel.

9. A grinding machine according to claim 3, which includes a worm wheel on said spindle outside the cylinder, power operable means for biasing said worm wheel to rotate said spindle, a ratchet wheel on the spindle outside said cylinder, pawl means on the machine frame biased toward engagement with said ratchet wheel, and electromagnetic means operable for withdrawing said pawl from said ratchet wheel.

References Cited
UNITED STATES PATENTS

| | | | |
|---|---|---|---|
| 2,142,669 | 1/1939 | Carpenter | 51—34 X |
| 2,661,579 | 12/1953 | Lomazzo | 51—50 X |
| 2,745,221 | 5/1956 | Comstock | 51—95 X |
| 3,146,551 | 9/1964 | Carlsen | 51—34 |
| 3,247,620 | 4/1966 | Happel | 51—165 X |

HAROLD D. WHITEHEAD, *Primary Examiner.*